(No Model.)

A. FOLSOM.
CARRIAGE AXLE NUT.

No. 443,828. Patented Dec. 30, 1890.

WITNESSES
Frank G. Parker
Edward S. Day

INVENTOR
Andrew Folsom

UNITED STATES PATENT OFFICE.

ANDREW FOLSOM, OF CHELSEA, MASSACHUSETTS.

CARRIAGE-AXLE NUT.

SPECIFICATION forming part of Letters Patent No. 443,828, dated December 30, 1890.

Application filed September 27, 1890. Serial No. 366,365. (No model.)

*To all whom it may concern:*

Be it known that I, ANDREW FOLSOM, of Chelsea, in the county of Suffolk and State of Massachusetts, have invented certain new and useful Improvements in Carriage-Wheel-Axle Attachments, of which the following, taken in connection with the accompanying drawings, is a specification.

My invention relates to the attachment of a carriage-wheel to the axle, its object being to add to the nut in ordinary use for this purpose a washer adapted to fit the end of the axle in such a manner that it cannot turn on the said axle, and in combining with the same an elastic washer. This object I attain by the mechanism shown in the accompanying drawings, in which—

Figure 1:
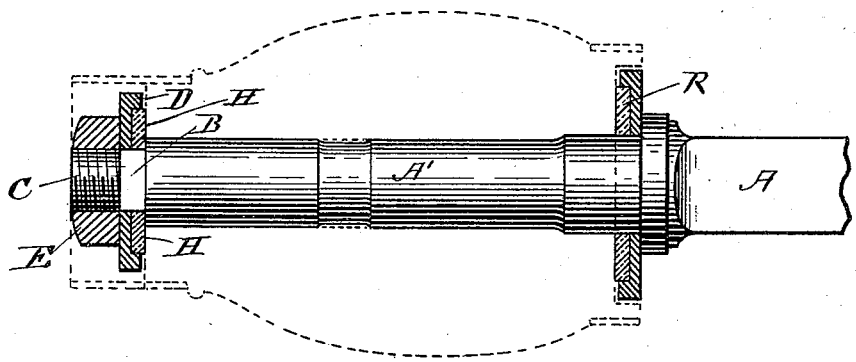
Figure 4:
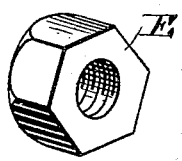
Figure 3:
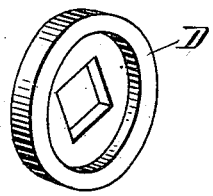
Figure 2:
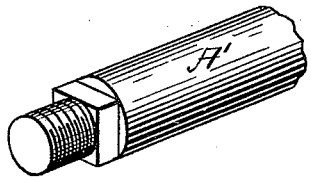
Figure 5:
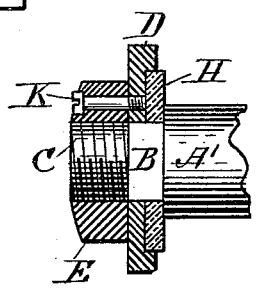

Figure 1 is an elevation showing the journal of an axle with the end washers and nut attached, the outline of the hub being indicated by dotted lines. Fig. 2 is a perspective view of the end of an axle, showing a squared end for receiving the holding-washer and a screw-threaded part for receiving the nut. Fig. 3 is a view in perspective of one of the holding-washers. Fig. 4 is a view in perspective of an ordinary screw-nut. Fig. 5 is a view, partly in section and partly in elevation, showing the end of a journal with a slightly-modified device for holding the screw-nut in place.

In the drawings, A represents the body of the axle, and A' one of its journals. This axle and its journals are made in the usual manner, except that the part B is made square, as shown clearly in Fig. 2, the screw part C being made in the ordinary manner.

D is a cup-shaped holding-washer made as shown, having a square opening to fit onto the squared part B of the axle. H is an elastic washer adapted to fit into the recess of the holding-washer, and E is a nut of the ordinary construction.

In use the hub of the wheel is placed upon the axle, the rear end resting against the washer R, made in any approved manner. Then the holding-washer D with the elastic washer H is placed onto the squared part B, and the nut E is screwed on. This device makes a fastening that securely checks the nut from being turned by the backing of the carriage, as the washer D cannot transmit the turning motion of the wheel to the nut and thus unscrew it. Again, as the washer H is elastic a certain pressure is always exerted through the washer D against the nut E, thus assisting in holding it on.

It is obvious that the part B need not be square, as any shape not round—as octagonal, for instance—would do as well, if the hole in the holding-washer were made to correspond to it.

In Fig. 5 I have shown an additional feature—that is, a screw-pin K unites the nut E to the holding-washer D. This gives greater security to the whole.

I claim—

In an attachment for carriage-wheels, the combination of the axle-journal having a squared seat for the reception of a cup-shaped holding-washer, in conjunction with a threaded portion for receiving a screw-nut, and a cup-shaped holding-washer having in its recess an elastic washer adapted to bear on the shoulder of the axle and the end of the hub, substantially as and for the purpose set forth.

In testimony whereof I have signed my name to this specification, in the presence of two subscribing witnesses, on this 26th day of September, A. D. 1890.

ANDREW FOLSOM.

Witnesses:
FRANK G. PARKER,
EDWARD S. DAY.